(12) United States Patent
Dimelow (10) Patent No.: US 9,410,440 B2
(45) Date of Patent: Aug. 9, 2016

(54) ROTOR ASSEMBLY

(71) Applicant: ROLLS-ROYCE PLC, London (GB)

(72) Inventor: Stephen Jonathan Dimelow, Uttoxeter (GB)

(73) Assignee: ROLLS-ROYCE PLC, London (GB)

( * ) Notice: Subject to any disclaimer, the term of this patent is extended or adjusted under 35 U.S.C. 154(b) by 437 days.

(21) Appl. No.: 13/937,687

(22) Filed: Jul. 9, 2013

(65) Prior Publication Data

US 2014/0023508 A1 Jan. 23, 2014

(30) Foreign Application Priority Data

Jul. 18, 2012 (GB) .................... 1212750.2

(51) Int. Cl.
*F01D 5/30* (2006.01)
(52) U.S. Cl.
CPC ............ *F01D 5/303* (2013.01); *F05D 2260/38* (2013.01); *Y02T 50/671* (2013.01)
(58) Field of Classification Search
None
See application file for complete search history.

(56) References Cited

U.S. PATENT DOCUMENTS

| | | | |
|---|---|---|---|
| 3,353,788 A * | 11/1967 | Weeds | F01D 5/323 416/221 |
| 5,123,813 A * | 6/1992 | Przytulski | F01D 5/26 403/372 |
| 7,108,484 B2 * | 9/2006 | Thenaisie | F01D 5/323 416/221 |
| 2004/0086387 A1 | 5/2004 | Fitts et al. | |
| 2005/0207892 A1 | 9/2005 | Kanebako et al. | |
| 2006/0165530 A1 | 7/2006 | Corbin et al. | |

FOREIGN PATENT DOCUMENTS

JP  A-1-237304  9/1989

OTHER PUBLICATIONS

Feb. 14, 2014 Search Report issued in British Application No. GB 1312283.3.
Nov. 15, 2012 British Search Report issued in British Patent Application No. GB1212750.2.

* cited by examiner

*Primary Examiner* — Ninh H Nguyen
*Assistant Examiner* — Justin Seabe
(74) *Attorney, Agent, or Firm* — Oliff PLC (57) ABSTRACT

A rotor assembly includes a rotor disc and a plurality of circumferentially-spaced, radially outwardly extending rotor blades. The rotor disc has a rim and a plurality of circumferentially spaced slots provided in the rim of the rotor disc, each rotor blade having a root, the root of each rotor blade being arranged in a corresponding one of the slots in the rim of the rotor disc, and at least one of the slots having a chocking device accommodated within a space between a radially outer surface of the slot and a radially inner surface of the root of the rotor blade. The chocking device includes at least a first spring and a second spring, the first and second springs each abutting a radially inner surface of the root of the corresponding rotor blade and arranged transversely relative to a longitudinal axis of the slot.

14 Claims, 6 Drawing Sheets

ROTOR ASSEMBLY

The present invention relates to a rotor assembly, and more particularly a rotor assembly for a gas turbine engine with an improved chocking arrangement.

A gas turbine engine includes a number of rotor assemblies, including a fan assembly for accelerating air received through an air intake of the engine. The fan assembly typically comprises a fan disc carrying a plurality of circumferentially spaced radially outwardly extending fan blades. The fan assembly has a fan disc and a plurality of circumferentially arranged slots provided in the rim of the fan disc. Each fan blade has a root and the root of each fan blade is arranged in a corresponding one of the slots in the rim of the fan disc. The roots of the fan blades are generally dovetail-shaped in cross-section, and the slots in the fan disc are correspondingly shaped to receive the roots of the fan blades.

The fan blades in a gas turbine engine are relatively large, particularly in aerospace applications. When the engine is running, the blades are centrifuged outward so that the dovetail roots of the fan blades are held in contact with, and retained by, correspondingly-shaped faces of the fan disc slots. However, when the engine spools down, the centrifugal force is overcome by the weight of the fan blade below a certain speed. Hence, at low rotation speeds, the fan blade roots tend to fall loose and move relative to the disc slots. This unconstrained movement can lead to fretting between the fan blade roots and disc slots, which causes loss of the lubricant between the mating faces. There is therefore a risk of damage, if not actual damage, every time the engine is shut down or started. Similar movement, with similar consequences, may be caused by the windmilling—caused by the wind blowing through the engine—that is commonly seen when an aircraft is parked on the ground.

Fan blades are typically chocked by inserting a spring-carrying slider, in the form of a tray, under them. The spring is of a leaf design and fits to the slider before being driven between the blade and the base of the slot, such that the spring is compressed. However, in some situations, a spring cannot be sized with sufficient strength to hold the blade in position during very slow revolutions, or when stationary. This is due to restrictions in slot and blade design, which limit the size of the spring that may be accommodated between the root of the fan blade and the base of the slot in the fan disc. In particular, a spring having increased size may be too difficult to assemble without damaging the spring, slider or blade, or may become permanent set when assembled.

There has now been devised an improved rotor assembly which overcomes or substantially mitigates the above-mentioned and/or other disadvantages associated with the prior art.

According to the invention there is provided a rotor assembly, and a gas turbine engine comprising such a rotor assembly, as set out in the claims.

Embodiments of the invention will now be described in detail, with reference to the accompanying drawings, in which

FIG. 7 is a schematic plan view (FIG. 7(a)) and a schematic end view FIG. 7(b)) of a chocking arrangement of a second prior art rotor assembly;

Figure 1:
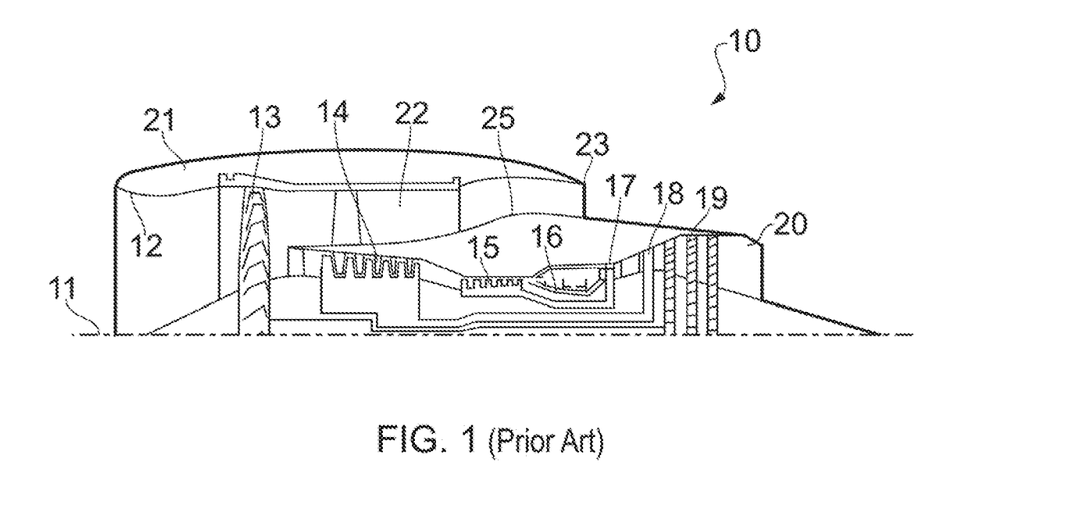
FIG. 1 is half longitudinal section through a gas turbine engine of known type.

With reference to FIG. 1, a ducted fan gas turbine engine generally indicated at 10 has a principal and rotational axis 11. The engine 10 comprises, in axial flow series, an air intake 12, a fan assembly 13, an intermediate pressure compressor 14, a high-pressure compressor 15, combustion equipment 16, a high-pressure turbine 17, and intermediate pressure turbine 18, a low-pressure turbine 19 and a core engine exhaust nozzle 20. A nacelle 21 generally surrounds the engine 10 and defines the intake 12, a bypass duct 22 and a bypass exhaust nozzle 23.

The gas turbine engine 10 works in a conventional manner so that air entering the intake 12 is accelerated by the fan assembly 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive, the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan assembly 13 by suitable interconnecting shafts.

Alternative gas turbine engine arrangements may comprise a two, as opposed to three, shaft arrangement and/or may provide for different bypass ratios. Other configurations known to the skilled person include open rotor designs, such as turboprop engines, or else turbojets, in which the bypass duct is removed such that all air flow passes through the core engine. The various available gas turbine engine configurations are typically adapted to suit an intended operation which may include aerospace, marine, power generation amongst other propulsion or industrial pumping applications.

Figure 2:
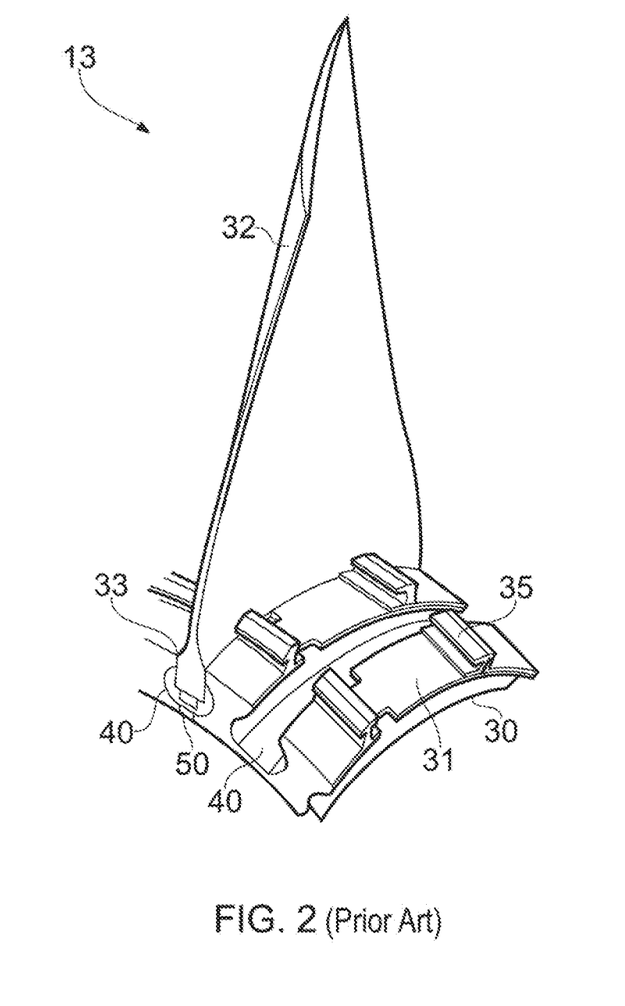
FIG. 2 is a partial perspective view of a prior art fan assembly for a gas turbine engine.

A portion of a prior art fan assembly 13 is shown in more detail in FIG. 2. The fan assembly 13 comprises a fan disc 30, and a plurality of circumferentially-spaced, radially outwardly extending fan blades 32. The fan disc 30 has a hub (not shown in FIG. 2) and a rim 31, and a plurality of circumferentially spaced slots 40 are provided in the rim 31 of the fan disc 30. The rim 31 also includes fixings 35 for annulus filler components, which are assembled between the fan blades 32.

Each fan blade 32 has a root 33 and the root 33 of each fan blade 32 is arranged in a corresponding one of the slots 40 in the rim 31 of the fan disc 30. The root 33 of each fan blade 32 is substantially dovetail shaped in cross-section and each slot 40 is correspondingly shaped to receive the root 33 of the corresponding fan blade 32. Each of the slots 40 in the rim 31 of the fan disc 30 also has a chocking device 50, an example of which is shown in more detail in FIG. 3. Each chocking device 50 abuts a radially outer surface of the corresponding slot 40 and each chocking device 50 also abuts a radially inner surface of the root 33 of the corresponding fan blade 32.

Figure 3:
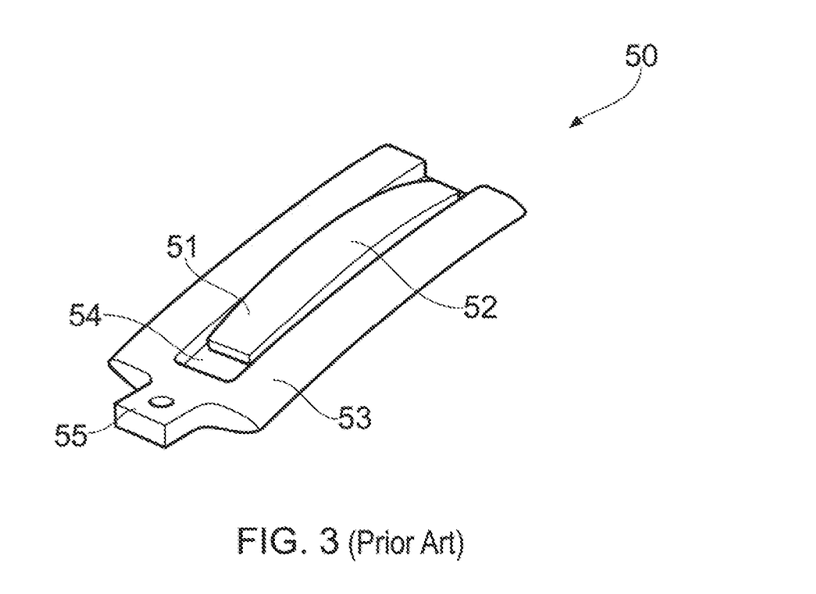
FIG. 3 is a perspective view of a chocking device for use with a prior art fan assembly for a gas turbine engine.

As shown in FIG. 3, the chocking device 50 comprises a spring 51 and a slider 53. The slider 53 supports and retains the spring 51, and facilitates engagement of the chocking device 50 with the slot 40 of FIG. 2. The slider 53 has an enclosing wall, which extends along the longitudinal edges and an end edge of the slider 53, such that a recess 54 is defined for accommodating the spring 51. The recess 54 is open at one end of the slider 53, and is sized to receive the spring 51 with a close fit. At the closed end of the slider 53, an attachment flange 55 is provided, with a central aperture, for engagement by assembly apparatus.

The spring 51 is a rectangular leaf spring, with a central load surface 52 of reduced dimensions relative to the base of the spring 51. The base of the spring 51 is accommodated within the recess 54 of the slider 53, with a close fit. The height of the spring 51 is selected depending on the chocking force required, but the load surface 52 projects from the recess 54 to a sufficient extent that the required compression of the spring 51, when assembled, is enabled.

As explained previously, when the engine is running, the fan blades 32 are centrifuged outward and are retained by the slots 40 in the fan disc 30. However, when the engine spools down, the centrifugal force is overcome by the weight of the fan blade 32, below a certain speed. Hence, at low rotation speeds, the fan blades 32 would fall loose and flop around in the fan disc 30 were they not chocked by the chocking device 50. The unconstrained movement would lead to potential damage every time the engine spooled down and started again.

Figure 4:
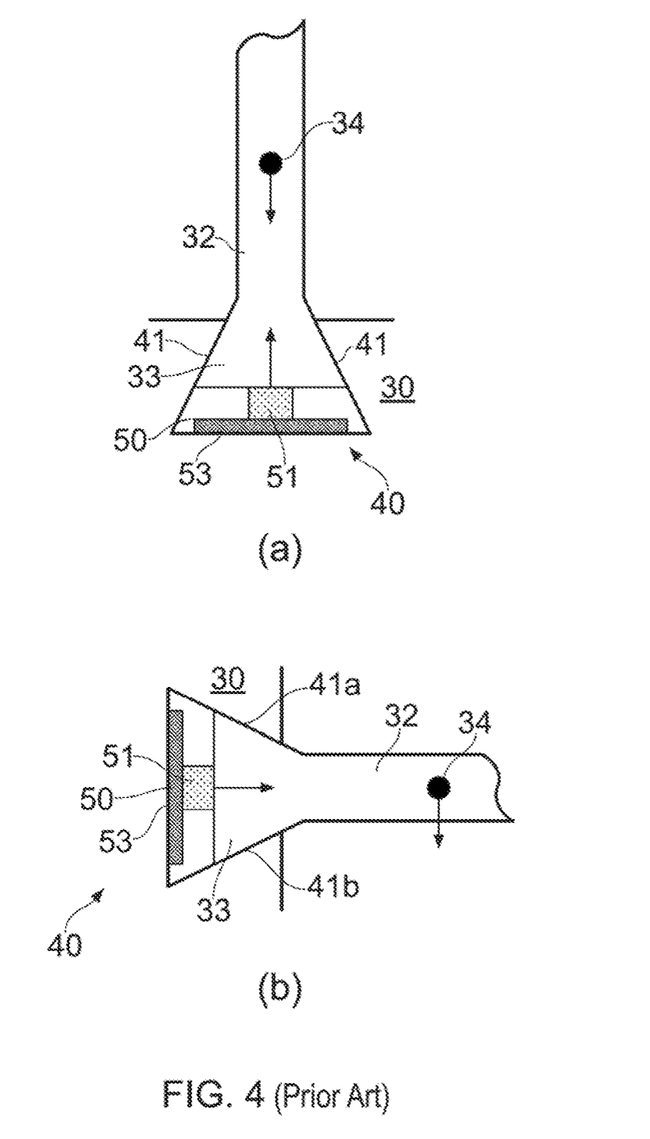
FIG. 4 is a schematic diagram of a prior art chocking arrangement, with a fan blade at a 12 o'clock position in FIG. 4(a) and a fan blade at a 3 o'clock position in FIG. 4(b)

FIG. 4 illustrates, schematically, a prior art chocking arrangement, using the chocking device 50 of FIG. 3. In this arrangement, the chocking device 50 applies a chocking force to the root 33 of the fan blade 32, which urges the root 33 against the flank surfaces (the flanks 41) of the slot 40. This chocking force typically needs to be sufficient to maintain engagement between the root 33 of the fan blade 32 and the flanks 41 of the slot 40.

When the fan blade 32 is stationary in a 12 o'clock position, as shown in FIG. 4(a), the chocking force needs to be at least sufficient to counteract the weight of the fan blade 32. This is illustrated in FIG. 4(a) with the directions of the chocking force provided by the spring 51, and the gravitational force acting from the fan blade's centre of gravity 34, being indicated. When the fan blade 32 is stationary in a 3 o'clock position, as shown in FIG. 4(b), the chocking force needs to be at least sufficient to counteract the torque generated by the gravitational force acting from the fan blade's centre of gravity 34. This is illustrated in FIG. 4(b) with the directions of the chocking force provided by the spring 51, and the gravitational force acting from the fan blade's centre of gravity 34, being indicated. The chocking force required to maintain engagement between the root 33 of the fan blade 32 and the flanks 41 of the slot 40 is greatest in the 3 o'clock position, and hence the chocking device 50 is typically configured to provide at least a sufficient chocking force in that configuration.

It will be clear from FIG. 4(b) that the effect of the forces acting on the fan blade 32 when it is stationary in the 3 o'clock position will tend to cause the root 33 to engage more firmly with the upper flank 41a of the slot 40, and to disengage from the lower flank 41b. Of course, it will be appreciated that when the fan blade is in the 9 o'clock position the positions of the flanks 41a, 41b will be reversed, but the root 33 will still tend to engage more firmly with the upper flank and disengage from the lower flank.

The spring 51 is selected with an uncompressed height that is greater than the separation between a radially outer surface of the slider 53 and a radially inner surface of the root 33, such that the spring 51 is compressed when the slider 53 and the spring 51 are engaged with the slot 40. In particular, the spring 51 is selected with a compression when assembled that provides a chocking force that is at least sufficient to hold both sides of the root 33 in engagement with the flanks 41a, 41b of the slot 40, when the fan blade 32 is stationary in the 3 o'clock position, as discussed above. The separation between the radially outer surface of the slider 53 and the radially inner surface of the root 33 is determined and constrained by the required configurations of the slider 53, the fan disc 30 and the slots 40.

Figure 5:
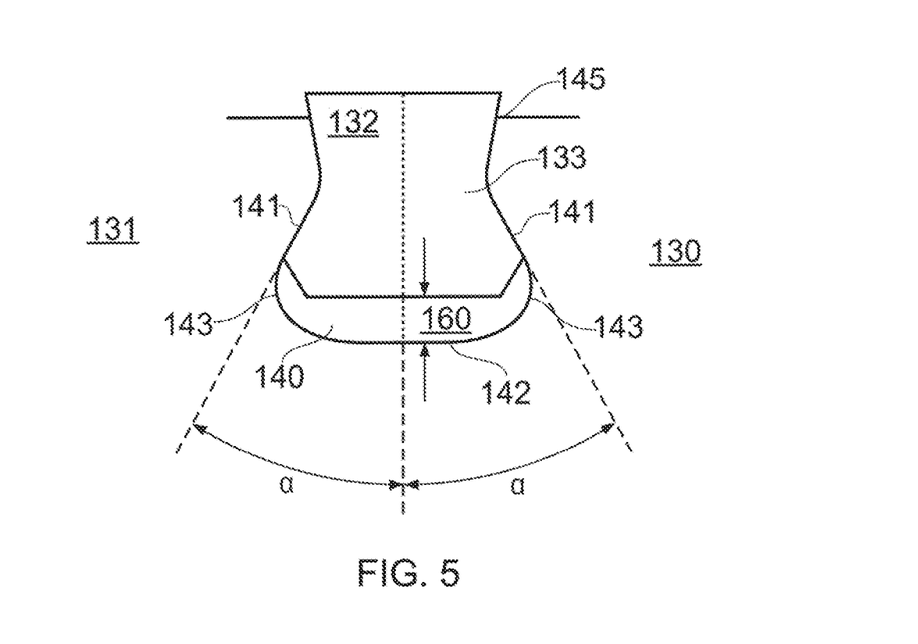
FIG. 5 is an end view of a slot in a rim of a fan disc, and a root of a fan blade engaged therewith, which components form part of the rotor assembly and gas turbine engine according to the invention.

FIG. 5 is an end view of a lower portion of a fan blade 132, including a root 133, engaged with a slot 140 in a rim 131 of a fan disc 130, before engagement of a chocking device. The slot 140 comprises a radially inner portion with an enlarged transverse cross-section for receiving the root 133 of the fan blade 132, and a radially outer opening through which the fan blade 132 extends radially outwardly. The slot 140 may have a substantially flat base 142, which is joined along each longitudinal edge by blended radii 143, to opposing flanks 141. The flanks 141 are surfaces that face inwardly, generally towards the base 142 of the slot 140, and hence define the radially inner surfaces of the slot 140 that are engaged by the root 133 of the fan blade 132. In particular, the angles and lengths of the flanks 141 of the slot 140 are configured to retain the fan blade 132, during normal use and in fan blade off (FBO) conditions, and the configuration of the flanks 141 is calculated on the basis of the crushing and contact stresses of the root 133. The radially outer portion 145 of the slot 140 increases in width as it extends radially outwardly from the flanks 141, and terminates at a radially outer opening through which the fan blade extends.

Each flank 141 forms an angle $\alpha$ with the central longitudinal axis of the blade. The included flank angle is defined as the angle $2a$ between the blades. Titanium fan blades typically have an included flank angle of about 90 degrees. By contrast, composite fan blades typically have a significantly smaller included flank angle of about 60 degrees.

A chocking device is accommodated within a space between the radially inner surface of the root 133 of the fan blade 132 and the base 142 of the slot 140. The height of this space for accommodating the chocking device is indicated by reference numeral 160 in FIG. 5. In particular, during assembly, the chocking device is inserted using assembly apparatus into this space, such that the spring is compressed during insertion and provides the desired chocking force once assembled.

Figure 6:
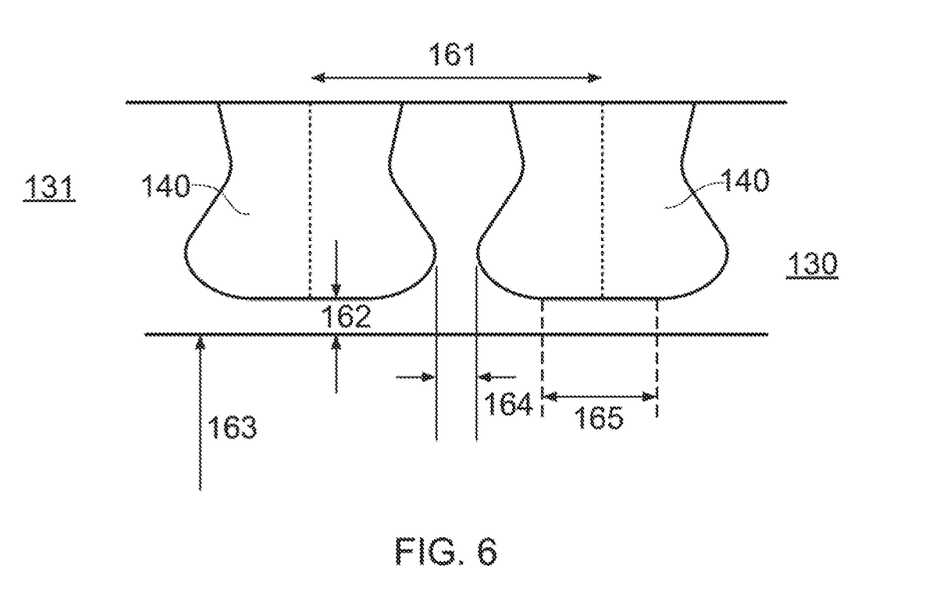
FIG. 6 is an end view of adjacent slots in a rim of a fan disc, which form part of the rotor assembly and gas turbine engine according to the invention.

In FIG. 6, two adjacent slots 140 are shown, with particular dimensions indicated. The blade pitch 161 determines the separation of the central, radial axes of the slots 140. The height 160 (FIG. 5) of the space for accommodating a chocking device is preferably reduced in order to increase the minimum distance between the base 142 of the slot 140 and the radially inner surface 163 of the rim 131 of the fan disc 130 (the base thickness 162). This increase in the base thickness 162 enables the slots 140 to be moved radially outwards, and hence enables an increase in the minimum distance between adjacent slots (the inter slot thickness 164) for a particular blade pitch 161. An increase in the inter slot thickness 164 reduces the risk of a fan blade 132 escaping the slot, for example when an adjacent fan blade has been lost, which can lead to "unzipping" of the fan blades 132 from the fan disc 130 in this situation.

There are therefore competing requirements to reduce the height 160 of the space for accommodating a chocking device in order to increase the strength of the fan disc 130, particularly in terms of fan blade retention, and to provide a chocking device having a spring with a sufficient size that its compression, when assembled, provides the required chocking force. A further constraint is the height of the slider, which must be sufficient to provide the strength to enable assembly of the chocking device in the slot 140, as discussed above, and also to support the spring during a bird strike.

In some situations, the height 160 of the space for accommodating the chocking device is not sufficient to accommodate a spring with sufficient strength to hold a fan blade 132 in position during very slow revolutions, or when stationary. In particular, a spring having increased size may be too difficult to assemble without damaging the spring, slider or fan blade 132, or may become permanent set when assembled.

Also, the available width 165 of the slot 140, between the radii 143 (FIG. 5), limits the possible width of the spring and slider, and this places a further constraint on the achievable chocking force.

Figure 7:
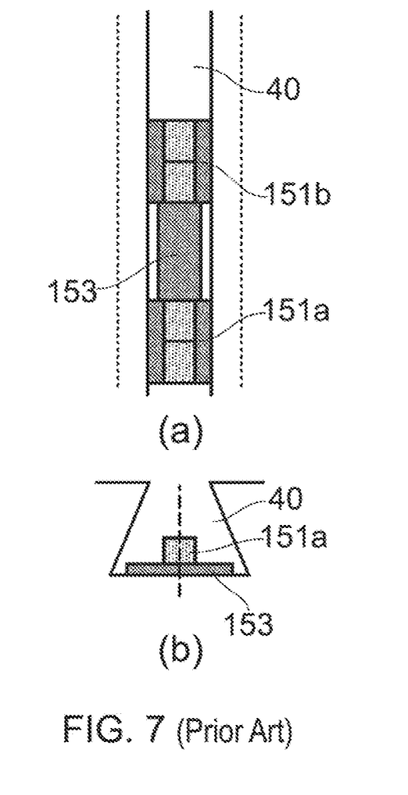
Figure 8:
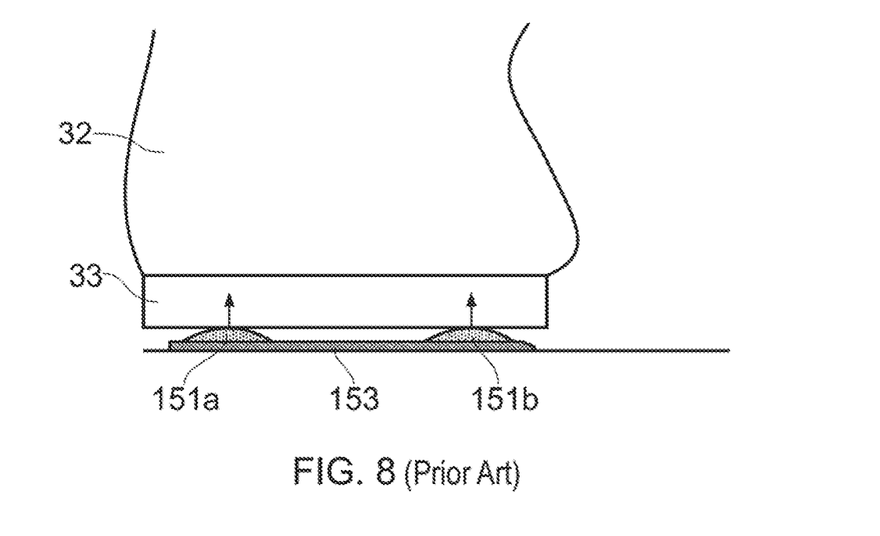
FIG. 8 is a schematic side view of the chocking arrangement of FIG. 7.

FIGS. 7 and 8 illustrate, schematically, a second prior art arrangement, in which two springs 151a, 151b are provided, supported by an elongated slider 153, the springs 151a, 151b being arranged along a central longitudinal axis of the slot 40. The provision of two longitudinally arranged springs 151a, 151b may enable a greater chocking force to be provided, without the need to increase the size of the spring 51 of the prior art. However, the provision of the elongated slider 153 adds weight to the assembly, which is undesirable.

Furthermore, the arrangement of FIGS. 7 and 8 results in a chocking force being applied both at the front and at the rear of the blade root 33, which is undesirable in some circumstances. For example, composite fan blades behave differently under impact (such as bird impact) than do titanium fan blades, and composite fan blade assemblies must be designed to behave appropriately under impact loading. In particular, it is desirable that composite fan blades be allowed to move or pivot under impact so that the blade root can contact the bottom of the disc slot, thereby dissipating energy. Because the arrangement of FIGS. 7 and 8 applies a chocking force both at the front and at the rear of the blade root, this desirable movement or pivoting is inhibited, and so this arrangement is unsuitable for use with composite fan blades.

Figure 9:
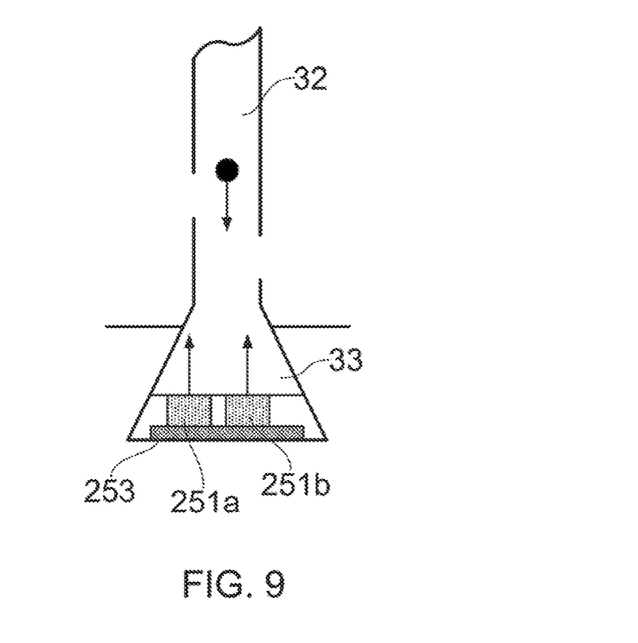
FIG. 9 is a schematic end view of a chocking arrangement of a rotor assembly according to the invention.
Figure 10:
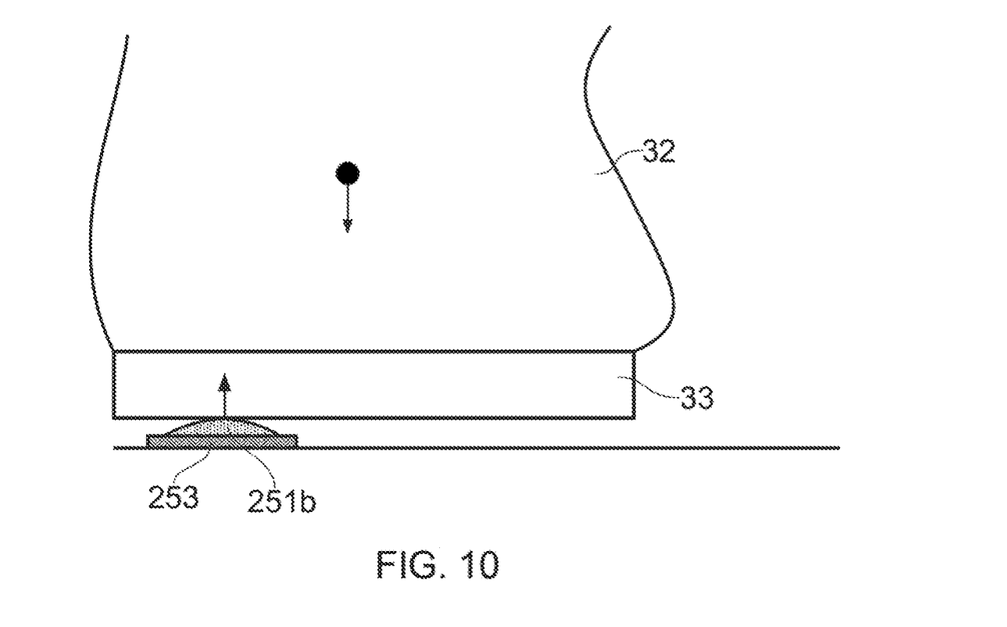
FIG. 10 is a schematic side view of the chocking arrangement of FIG. 9.

In an embodiment of a rotor assembly according to the invention, which is illustrated schematically in FIGS. 9 and 10, two springs 251a, 251b are arranged transversely relative to a central, longitudinal axis of the slot 40, at the front (upstream) end of the slot 40. The springs are supported by a slider 253 for accommodating two springs in a transverse arrangement, the springs 251a, 251b being arranged to each side of a central longitudinal axis of the slider 253.

This arrangement allows a greater chocking force to be provided than is achievable by a single spring, without increasing the axial length of the slider assembly. As previously mentioned, composite fan blade arrangements typically have a smaller included flank angle than titanium fan blades. This, together with the fact that composite fan assemblies tend to have fewer, thicker blades, means that the blade roots and blade slots (and hence the available width 165 in FIG. 6) can be larger for composite blades than for titanium.

Because a chocking force is provided only at the front of the slot 40, the fan blade 32 is able to rotate or pivot rearwardly in use, for example in fan blade off (FBO) conditions or in the event of a birdstrike. For a composite fan blade, this allows the desirable behaviour under impact that the fan blade root can contact the bottom of the disc slot and thereby dissipate energy.

It will be appreciated that the chocking arrangement need not be located in the precise axial position shown in FIG. 10, but that it may be located further forward or further rearward to suit the desired blade behaviour, especially under impact loading. Generally, though, the chocking arrangement will be offset towards the front (upstream) end of the slot.

As is clear from FIG. 9, this chocking arrangement applies two discrete chocking forces to transversely-spaced positions of the blade root 33. This allows the chocking force to be more precisely controlled than in prior art arrangements to provide more effective chocking of the fan blade under all operating conditions. This is in contrast to known blade chocking arrangements, in which the chocking force is transmitted at a single position or over a diffuse area.

For example, the two springs 251a, 251b may be of different strengths. This may be of particular benefit because real fan blades are curved and leant and the centre of gravity is therefore generally not aligned with the centre of the root (as is shown in the simplified, schematic illustration in FIG. 4(b)). Because of this asymmetry, the respective loadings on the upper and lower flanks will not be the same in the 3 o'clock and 9 o'clock positions, and the design of the chocking arrangement must take account of this so that sufficient chocking force is available in all blade positions. The use of different spring strengths will permit simpler optimisation of the chocking force, while minimising weight and cost.

Real fan blades also often have curved roots, and it will be appreciated that this also causes asymmetry in the loading of the blade root in different rotational positions. To counteract this, it may for example be desirable to increase the strength of the spring nearer to the inner radius of the curve.

Likewise, the two springs need not be equidistant from the central, longitudinal axis of the slot. An asymmetrical arrangement of the springs may permit a more favourable application of the discrete chocking forces to the blade root; especially where (as explained above) the blade geometry introduces significant asymmetry into the blade loading.

In an alternative embodiment of the invention, not illustrated in the drawings, the two springs are mounted on separate sliders, which upon installation are transversely spaced between the radially inner surface of the root of the fan blade and the base of the slot, so as to provide discrete chocking forces in the same manner as explained above.

The invention claimed is:
1. A rotor assembly comprising:
a rotor disc, the rotor disc having a rim and a plurality of circumferentially spaced slots provided in the rim of the rotor disc; and
a plurality of circumferentially-spaced, radially outwardly extending rotor blades, each of the plurality of rotor blades having a root, the root of each of the plurality of rotor blades being arranged in a corresponding one of the slots in the rim of the rotor disc, and each of the slots having a chocking device accommodated within a space between a radially outer surface of each of the slots and a radially inner surface of the root of a corresponding one of the plurality of the rotor blades,
wherein each chocking device includes at least a first spring and a second spring, the first spring and the second spring each abutting a radially inward-facing surface of the root of the corresponding one of the plurality of rotor blades, the first spring and the second spring each being configured to apply a radially outward spring force to the radially inward-facing surface of the root, and wherein the first spring and the second spring are arranged transversely relative to a longitudinal axis of each of the slots, the first spring and the second spring being substantially aligned in a plane extending transverse to the longitudinal axis, the first spring and the second spring being nearer to a front end of each of the slots than to a rear end of each of the slots, the front end of each of the slots being towards an upstream end of the rotor assembly and the rear end of each of the slots being towards a downstream end of the rotor assembly.

2. The rotor assembly as claimed in claim 1, wherein the first spring and the second spring apply discrete chocking forces transversely spaced on the root of the corresponding one of the plurality of rotor blades.

3. The rotor assembly as claimed in claim 1, wherein the first spring and the second spring are offset, with respect to a central portion of each of the slots, in an axial direction with respect to the rotor disc.

4. The rotor assembly as claimed in claim 1, wherein the first spring and the second spring being nearer to the front end is configured to enable the corresponding one of the plurality of rotor blades to rotate rearwardly, in use.

5. The rotor assembly as claimed in claim 1, wherein the first spring and the second spring are arranged to each side of the longitudinal axis of each of the slots, the longitudinal axis of each of the slots being radially aligned with the center of gravity (COG) of the corresponding one of the plurality of rotor blades.

6. The rotor assembly as claimed in claim 5, wherein the first spring and the second spring are not equidistant from the longitudinal axis of each of the slots.

7. The rotor assembly as claimed in claim 1, wherein the first spring and the second spring have different strengths.

8. The rotor assembly as claimed in claim 1, wherein the first spring and the second spring are supported by at least one slider, interposed between a radially inner surface of each of the slots and the first spring and the second spring.

9. The rotor assembly as claimed in claim 8, wherein the first spring and the second spring are supported by a single slider, the rotor assembly including a plurality of sliders, and each slot of the rotor disc containing one of the plurality of sliders, supporting the first spring and the second spring.

10. The rotor assembly as claimed in claim 8, wherein the rotor assembly includes a plurality of sliders, and wherein the first spring and the second spring are supported by a first one of the plurality of sliders and a second one of the plurality of sliders, each slot of the rotor disc containing two of the plurality of sliders respectively supporting the first spring and the second spring.

11. The rotor assembly as claimed in claim 1, wherein each slot has a radially inner portion with an enlarged transverse cross-section for receiving the root of the corresponding one of the plurality of rotor blades, and a radially outer opening through which the corresponding one of the plurality of rotor blades extends radially outwardly.

12. The rotor assembly as claimed in claim 11, wherein each slot has a base, which is joined along each longitudinal edge to opposing flanks, the flanks being surfaces that face inwardly, towards the base of each of the slots, and define radially inner surfaces of each of the slots that are engaged by the root of the corresponding one of the plurality of rotor blades.

13. The rotor assembly as claimed in claim 1, wherein the rotor assembly is a fan assembly for a gas turbine engine.

14. A gas turbine engine comprising the rotor assembly as defined in claim 1.

* * * * *